United States Patent [19]
Moritz

[11] Patent Number: 4,784,544
[45] Date of Patent: Nov. 15, 1988

[54] LINK-BAND COVER

[75] Inventor: Werner Moritz, Siegen, Fed. Rep. of Germany

[73] Assignee: Kabelschlepp GmbH, Siegen, Fed. Rep. of Germany

[21] Appl. No.: 896,426

[22] Filed: Aug. 31, 1986

[30] Foreign Application Priority Data

Aug. 27, 1985 [DE] Fed. Rep. of Germany ... 8524436[U]
Dec. 3, 1985 [DE] Fed. Rep. of Germany ....... 3542692

[51] Int. Cl.4 ............................................. B23B 47/00
[52] U.S. Cl. .................................... 409/235; 408/234; 408/710; 409/134; 474/256
[58] Field of Search ................ 403/381, 331; 474/253, 474/255, 256, 257; 16/257, 261, 263, 270; 408/234, 710, 56; 409/235, 734

[56] References Cited

U.S. PATENT DOCUMENTS 2,727,399 12/1955 Hjort ................................. 474/255

FOREIGN PATENT DOCUMENTS 2020108 11/1971 Fed. Rep. of Germany .
8104252 7/1981 Fed. Rep. of Germany .
3020621 12/1981 Fed. Rep. of Germany .

Primary Examiner—Howard N. Goldberg
Assistant Examiner—Joseph M. Gorski
Attorney, Agent, or Firm—Becker & Becker, Inc.

[57] ABSTRACT

A link-band cover for guideways and moving parts of machine tools, as well as for other structural elements of machine tools that could lead to accidents. The cover includes individual rigid strips that can be sequentially arranged in a plane. Each strip has long sides, with adjacent long sides of adjacent ones of the strips each being provided with a respective slot that is open toward the adjacent strip and has an undercut base. Hinge members in the form of hinge eyes are disposed between each two adjacent strips to pivotably interconnect the same, with each hinge eye being anchored in one of the slots of the strips. Hinge eyes between two adjacent strips are aligned on a pivot shaft, with adjacent hinge eyes being anchored in the slots of different strips.

15 Claims, 2 Drawing Sheets

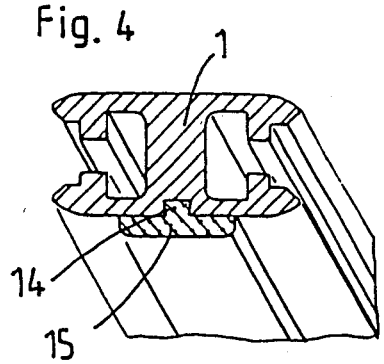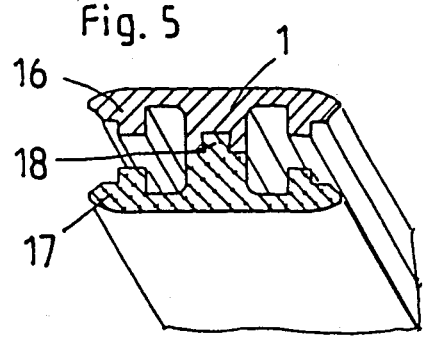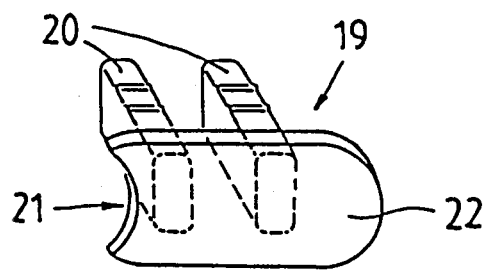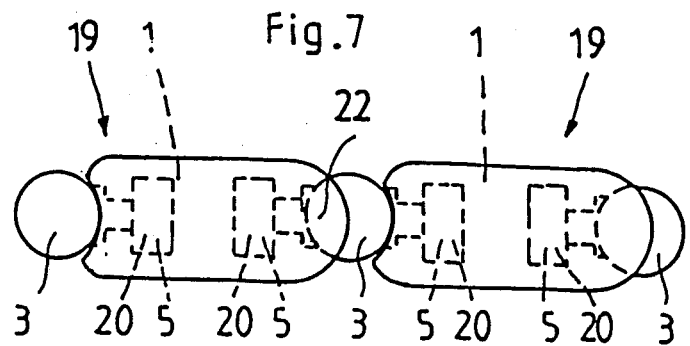

LINK-BAND COVER

BACKGROUND OF THE INVENTION

1. Field of the Invention

The present invention relates to a jointed or link-band cover for guideways and moving parts of machine tools, as well as for other structural elements of machine tools that could lead to accidents.

2. Description of the Prior Art

German Patent No. 30 20 621 Schmidberger dated Dec. 10, 1981 discloses a link-band cover, the strips of which are positively interconected via flexible plastic elements. With this heretofore known link-bank cover, it is difficult to replace the connecting elements when they become torn or otherwise broken because during assembly the longitudinal edges of the connecting elements are secured in recesses of the strips. In addition, the connecting plastic elements are partially exposed between the strips, and can be become damaged by hot chips or turnings.

German Offenlegungsschrift No. 20 20 180 Neureuther dated Nov. 11, 1971, corresponding to U.S. Pat. No. 3,680,927-Neureuther dated Aug. 1, 1972 discloses a link band that comprises a number of similar pivotably interconnected links which are provided on that side which faces an adjacent link with a coupling projection having a rotationally symmetrical outer profile, and which are provided on the opposite side with complementarily shaped coupling recesses. The coupling projections can be inserted into the coupling recesses, so that a hinge-like connection that has a limited pivot angle is produced between the individual links. The configuration of the individual links of this heretofore known link band, and especially of the coupling parts, is so complicated that the band can probably be made only of plastic. However, plastic link bands are unacceptable for many machine tool applications, because they could be destroyed by hot chips or turnings.

German Gebrauchsmuster No. 81 04 252 Hennig GmbH disclosed July 30, 1981 provides a covering that is made from a number of strip-like links that are pivotably interconnected in the region of their longitudinal edges; the connection comprises conventional hinge frames that are welded together. Cover plates and stripping edges are secured to the hinge frames to protect the latter.

It is an object of the present invention to provide a link-band cover that is easy to construct and assemble, and which is provided with links that require little maintenance, have a long life, and have no places where chips or turnings can wedge.

BRIEF DESCRIPTION OF THE DRAWINGS

This object, and other objects and advantages of the present invention, will appear more clearly from the following specification in conjunction with the accompanying schematic drawings, in which:

FIG. 4 is a perspective view, from below, of a strip into which has been inserted a plastic strip;

FIG. 5 is a perspective view, also from below, where the strip comprises two profiled members of different materials;

FIG. 6 is a perspective view of a cap piece; and

FIG. 7 is a side view of two interconnected strips, with cap pieces having been placed upon the end faces thereof.

SUMMARY OF THE INVENTION

Figure 1:
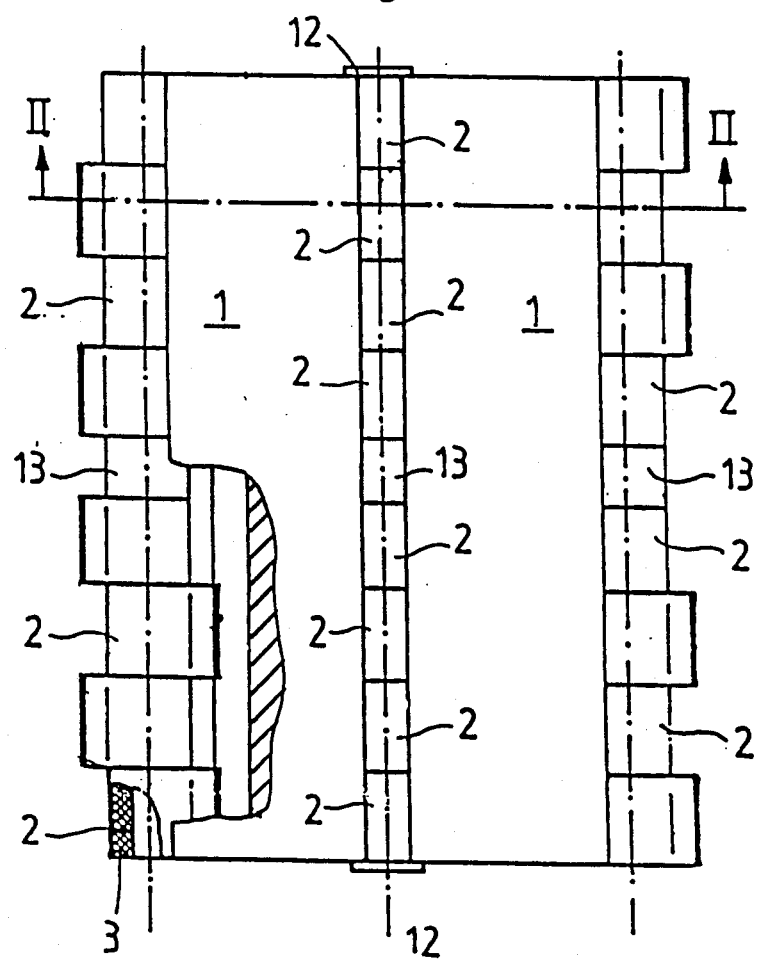
FIG. 1 is a plan view of two strips of a portion of one inventive embodiment of a linkband cover, whereby the strips are interconnected via hinge eyes provided at their free long sides.
Figure 2:
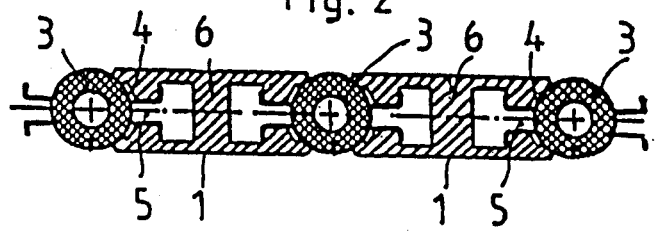
FIG. 2 is a cross-sectional view taken along the line II—II in FIG. 1.
Figure 3:
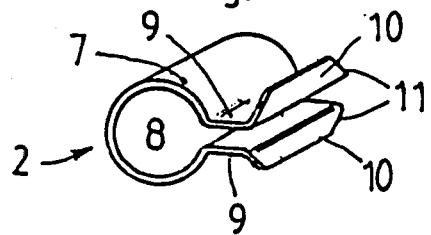
FIG. 3 is a perspective view of a hinge eye.

The link-band cover of the present invention comprises: individual rigid strips that can be sequentially arranged in a plane, each strip having long sides, with adjacent long sides of adjacent ones of the strips each being provided with a respective slot that is open toward the adjacent strip and has an undercut base; and hinge members that are disposed between each two adjacent strips to pivotably interconnect the same, with the hinge members being in the form of hinge eyes, each of which is anchored in one of the slots of the strips; hinge members between two adjacent strips are aligned on a pivot shaft, with adjacent hinge members being anchored in the slots of different strips.

Pursuant to one practical embodiment of the present invention, each long side of the strips can be provided with a concave groove that corresponds to the radius of the hinge eyes, with the slots opening into these concave grooves. In addition, the hinge eyes are expediently provided with parallel legs that are disposed on both sides of a longitudinal slot. The ends of the legs are bent outwardly, and can be anchored in the undercut slots of the strips.

Pursuant to another practical embodiment of the present invention, the pivot shafts are expediently tubular, so that expanding sleeves can be inserted into the open ends of the pivot shafts. The expanding sleeves are provided with heads that overlap the strips. Furthermore, the expanding sleeves prevent the pivot shafts from shifting in the longitudinal direction.

Various possibilities are available for matching the materials of the cover components, depending upon whether the cover is to be used merely as a protection against accidents, or also to prevent hot chips and/or cooling medium from penetrating the machine tool. If the link-band cover merely provides protection against accidents, all of the structural parts, mainly the strips, the hinge eyes, and the pivot shafts and the expanding sleeves, can be made of plastic. However, if pursuant to one practical application hot chips and/or corrosive coolant is to be kept away from the structural parts of the machine tool, the strips are expediently made of metal, for example aluminum or steel, and the hinge eyes are made of spring steel, thus assuring a long service life.

Different materials could also be used for the strips. For example, if the main body of the strips is made of aluminum, an aluminum alloy, or steel, the underside of the strips could be provided with plastic strips that extend parallel to the long sides and serve to protect the bed way. The plastic strips are advantageously inserted into the undersides of the strips via dovetailed guides. Alternatively, the undersides of the strips can be made of plastic, and the upper sides thereof can be made of aluminum, an aluminum alloy, or steel. The plastic underside again serves to protect the bed way, whereas the metal upper side provides protection from the chips or turnings. For such an embodiment, the strips advantageously each comprise two profiled members, one for each of the different materials of the underside and upper side, with the profiled members being interconnected via dovetailed guides.

In a further practical embodiment of the present invention, cap pieces are placed on the end faces of the strips. These cap pieces extend over the ends of the pivot shafts, and are provided with insertion pins that correspond to the slots of the strips. These pins are inserted into the slots of the strips. The cap pieces prevent an unintentional and undesired shifting of the individual strip to the side. Furthermore, the cap pieces serve as a closure for the end faces of the strips. The height of the cap pieces advantageously corresponds to the thickness of the strips, and one end of each cap piece has a circular indentation while the other end has a corresponding circular rounded portion, with the indentations and rounded portions of adjacent cap pieces pivotably sliding by one another. These cap pieces can be made of plastic.

A link-band cover constructed pursuant to the teaching of the present invention not only has the advantage of a straightforward construction, but it can also be automatically assembled in a simple manner. Repair causes no great difficulty, because all of the individual parts can be replaced. In the embodiment where all of the structural parts are made of metal, the inventive link-band cover has a long service life, because at the hinge joints ideal sliding matches can be provided, for example spring steel against aluminum, or spring steel against plastic.

Further specific features of the present invention will be described in detail subsequently.

DESCRIPTION OF PREFERRED EMBODIMENTS

Referring now to the drawings in detail, the jointed or link-band cover comprises a plurality of pivotably interconnected panels or strips 1, hinge eyes 2, and pivot shafts 3 that are inserted in the hinge eyes.

The long sides of each strip 1 are provided with respective concave grooves 4 that open into a slot 5 that is undercut at its base. Disposed between the slots 5 of each strip 1 is a cross piece 6 that assures adequate stability. The strips 1 have a flat, double-T-like profile.

Each hinge eye 2 comprises a pivot portion 7 that has a circular cross-sectional shape and that is provided with a longitudinal slot 8. Legs 9 that extend parallel to one another adjoin the pivot portion 7. The leg ends 10 are bent outwardly. The short end faces of the leg ends 10 are provided with inclined surfaces 11. The outer diameter of the pivot portion 7 of the hinge eyes 2 is approximately equal to the thickness of a given strip 1.

The pivot shafts 3 have the same length as do the strips 1, and are tubular in shape, so that expanding sleeves 12 can be inserted into the open ends. The heads of these sleeves 12 extend slightly over the end faces of the strips 1. The expanding sleeves 12 thereby prevent the pivot shafts 3 from shifting in the longitudinal direction.

The assembly of the inventive link-band cover is very straightforward. To start with, the hinge eyes 2 are lined up on the pivot shafts 3 in such a way that the legs 9 alternately point in opposite directions. Thereafter, the legs 9 of the hinge eyes 2 can be introduced from the end into the slots 5 of adjacent strips 1. The inclined surfaces 11 on the leg ends 10 of the hinge eyes 2 facilitate introduction into the slots 5. As a consequence of this process, the bent leg ends 10 of the hinge eyes 2 are anchored in the slots 5, with the hinge eyes 2 encircling the pivot shafts 3 in a somewhat prestressed manner. If the length of the strips 1 do not correspond precisely to a multiple of the width of the hinge eyes 2, adapters 13 can be placed in the center.

In the illustrated embodiment, the strips 1 are made of aluminum, the hinge eyes 2 are made of spring steel, and the pivot shafts 3 are made of plastic. This particular matching of material results in a light, corrosion-resistant link-band cover that moves well and has a long service life.

Further exemplary embodiments of the strips 1 are illustrated in FIGS. 4 and 5. In the embodiment of FIG. 4, the main body of the strip 1 is made of metal, for example aluminum, an aluminum alloy, or steel. Via a dovetailed guide 14, a plastic strip 15 is inserted into the underside of the strip 1. The plastic strip 15 extends parallel to the long sides of the strip 1, and serves to protect the bed way.

In the embodiment of FIG. 5, the strip 1 comprises two profiled members 16, 17 that are interconnected via a dovetailed guide 18. The upper profiled member 16 on the upper side of the strip 1 is made of aluminum, an aluminum alloy, or steel, and serves as a protection against hot chips or turnings. The lower profiled member 17 on the underside of the strip 1 is made of plastic or similar material, and serves to protect the bed way.

FIG. 6 illustrates a cap piece 19 that can be made of plastic. The cap piece 19 is provided with two pins 20 that can be inserted into the slots 5 of a strip 1, so that the cap piece 19 makes it possible to close off the end faces of the strips 1. One end of the cap piece 19 (the left end in the drawing) is provided with an indentation 21, and the other end (the right end in the drawing) is provided with a rounded portion 22.

FIG. 7 illustrates two cap pieces 19 that have been inserted into the end faces of two strips 1. The pivot shafts 3 between each two strips 1 are visible. The rounded portions 22 of the cap pieces 19 extend over the ends of the pivot shafts 3, thus preventing an undesired and unintentional lateral shifting of the individual strips 1. Furthermore, the cap pieces 19 provide a clean closure of the end faces of the strips 1, since the latter are otherwise open as a result of the slots 5.

The present invention is, of course, in no way restricted to the specific disclosure of the specification and drawings, but also encompasses any modifications within the scope of the appended claims.

What I claim is:

1. A link-band cover for guideways and moving parts of machine tools, and for other structural elements of the latter that could lead to accidents unless specifically protected against damage and destruction, said cover in combination comprising:

individual rigid strips that are sequentially arranged in alignment with each other side-by-side in a plane; each of said strips having long sides, with adjacent long sides of adjacent ones of said strips each being provided with a respective slot that is open toward said adjacent strip and that has an undercut base; and hinge members in the form of hinge eyes introduced into each slot and disposed between each two adjacent strips to pivotably interconnect the latter, with each hinge eye being inserted and anchored in a spacing from each other, said hinge eyes being readily interchanged due to being replaceable and interchangeable in one of said slots of said strips; hinge eyes between two adjacent strips also being aligned on a pivot shaft for an axially aligned movement relative to each other with adjacent hinge eyes between two strips being anchored in said slots of different ones of said two strips in a manner protected against damage and destruction via hot chips encountered during machine tool operation, wherein each of said long sides of a given one of said strips is provided with a concave groove that conforms to the radius of said hinge eyes, with each of said slots opening into a respective one of said concave grooves, and wherein each of said hinge eyes has a longitudinal slot formed by two parallel legs, each leg having an end that is bent outwardly away from the other leg.

2. A cover in combination according to claim 1, in which each of said leg ends has an inclined end face.

3. A cover in combination according to claim 1, in which each pivot shaft is tubular.

4. A cover in combination according to claim 1, in which the ends of each tubular pivot shaft are open and receive respective expanding sleeves, each of which has a head that extends over adjacent ones of said strips.

5. A cover in combination according to claim 1, in which said hinge eyes have a diameter that corresponds approximately to the thickness of said strips.

6. A cover in combination according to claim 7, in which said hinge eyes are disposed under preload in said slots of said strips.

7. A cover in combination according to claim 1, in which said strips are made of a material selected from the group consisting of plastic, aluminum, and steel.

8. A cover in combination according to claim 7, in which each of said strips is provided with essentially planar surfaces that extend between said long sides thereof, with a plastic strip being disposed on one of said planar sufaces.

9. A cover in combination according to claim 8, in which said plastic strips are secured to said strips via dovetailed guides.

10. A cover in combination according to claim 7, in which each of said strips is provided with essentially planar surfaces that extend between said long sides thereof, with one of said planar surfaces being made of plastic, and the other being made of a material selected from the group consisting of aluminum, an aluminum alloy, and steel.

11. A cover in combination according to claim 10, in which each of said strips comprises two profiled members, each of which is provided with one of said planar surface, said profiled members are interconnected via dovetailed guides.

12. A cover in combination according to claim 7, in which said hinge eyes are made of a material selected from the group consisting of plastic and spring steel.

13. A cover in combination according to claim 12, in which said pivot shafts are made of a material selected from the group consisting of plastic, aluminum, and steel.

14. A cover in combination according to claim 13, in which each of said strips has end faces into which said undercut bases of said slots open; and which includes cap pieces, each of which is provided with insertion pins that essentially conform in shape to that of said slots and are insertable into the latter, whereby said cap pieces extend over said pivot shafts.

15. A cover in combination according to claim 14, in which each of said cap pieces has a height that corresponds to the thickness of said strips; and in which each of said cap pieces has two ends, one of which is provided with a circular indentation, and the other of which is provided with a correspondingly circular rounded portion such that the indentations and rounded portions of adjacent cap pieces pivotably slide by one another.

* * * * *

UNITED STATES PATENT AND TRADEMARK OFFICE
CERTIFICATE OF CORRECTION

PATENT NO. : 4,784,544
DATED      : November 15, 1988
INVENTOR(S): Werner Moritz It is certified that error appears in the above-identified patent and that said Letters Patent is hereby corrected as shown below:

On the title page, please correct the filing date of the application to read as follows:

[22] Filed:   Aug. 13, 1986

Signed and Sealed this

Twenty-eighth Day of March, 1989

Attest:

DONALD J. QUIGG

Attesting Officer

Commissioner of Patents and Trademarks